UNITED STATES PATENT OFFICE.

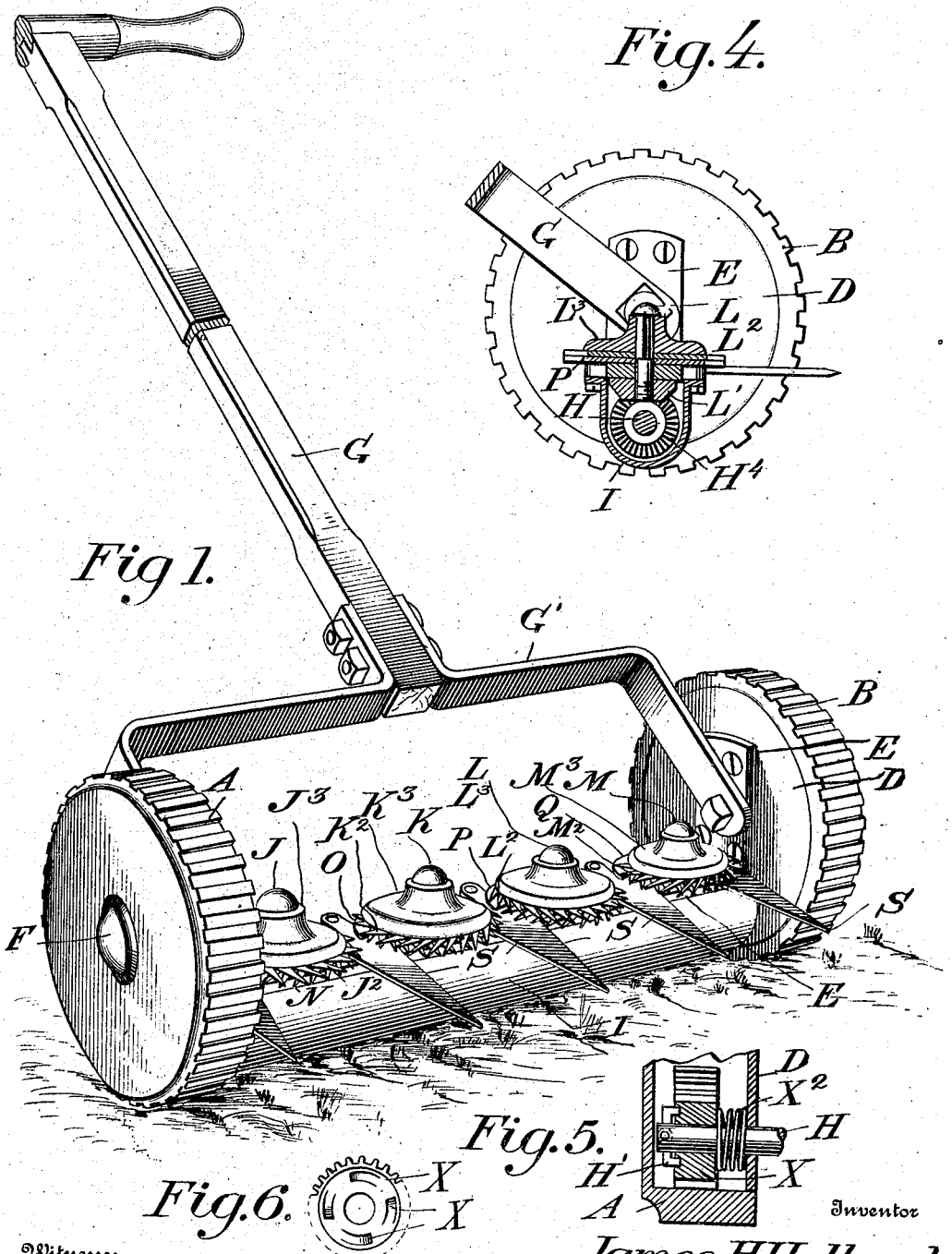

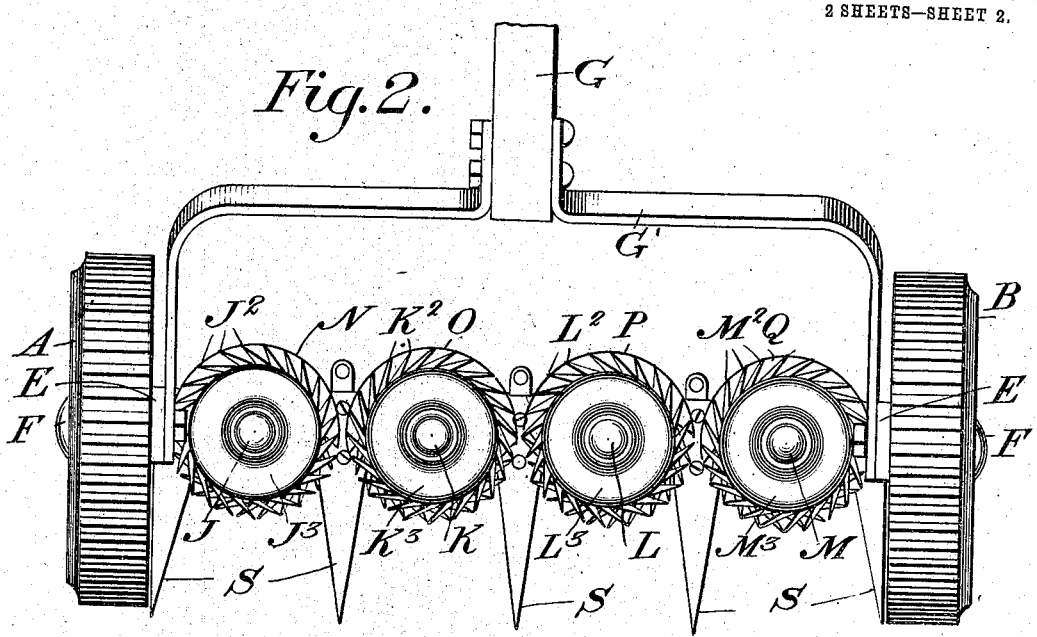
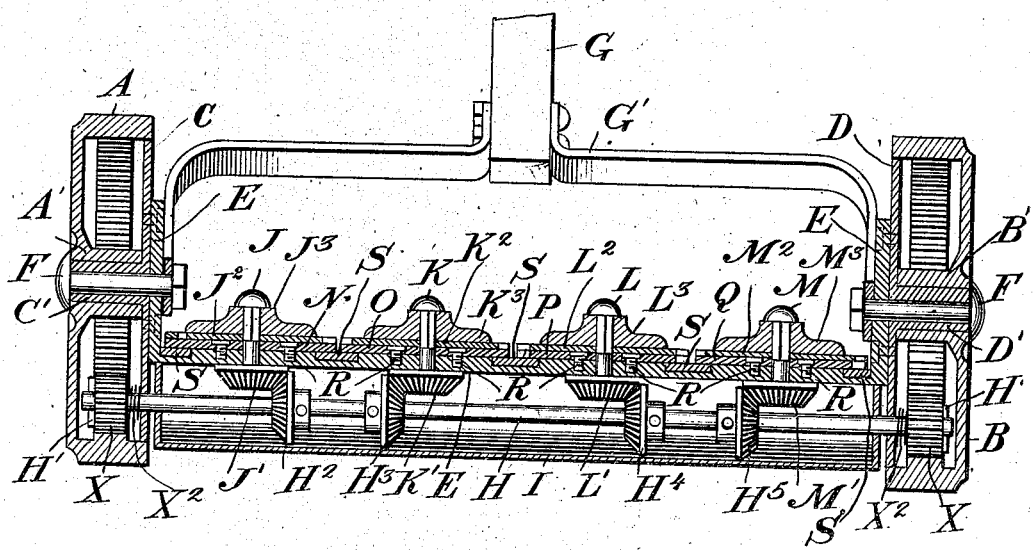

JAMES H. HOLLAND, OF SHASTA, CALIFORNIA.

LAWN-MOWER.

No. 894,887.

Specification of Letters Patent.

Patented Aug. 4, 1908.

Application filed January 30, 1907. Serial No. 354,849.

*To all whom it may concern:*

Be it known that I, JAMES H. HOLLAND, a citizen of the United States, residing at Shasta, in the county of Shasta and State of California, have invented a new and useful Improvement in a Lawn-Mower, of which the following is a specification.

This invention relates to lawn mowers and more particularly to mowers provided with rotary cutters, the object being to provide a mower which will readily cut long or short grass, thereby overcoming the difficulties now existing with mowers of this character.

Another object of my invention is to provide very novel means for preventing the cutter from being operated when the mower is moved backwardly.

Another object of my invention is to provide a lawn mower with a series of rotary cutters which rotate in opposite directions.

With these and other objects in view, the invention consists in the novel features of construction, combination and arrangement of parts, all hereinafter fully described and pointed out in the claims.

In the drawings forming a part of this specification:—Figure 1 is a perspective view of my improved lawn-mower. Fig. 2 is a front plan view of the mower. Fig. 3 is a transverse sectional view of the same. Fig. 4 is a longitudinal sectional view. Fig. 5 is a detail sectional view of one of the wheels, and Fig. 6 is a side view of the gear wheel showing the ratchet face.

In constructing my lawn mower I employ a pair of ordinary drive wheels A and B provided with the usual internal rack and having hub portions A' and B'. Within these hubs are loosely journaled sleeves C' and D' which carry, respectively, at their opposing ends disks D, said disks resting within the wheels A and B. A plate E extends from one wheel to the other and has its end portions bent at right angles to the body portions of the plate, and said end portions are secured to the disks D. An operating handle G has its lower end portion secured to metal arms G' the end portions of which are curved and the outer ends of these arms rest adjacent the end portions of the plate E and are pivotally mounted upon bolts F, which bolts pass through the hub A' and B', respectively, and also serve to secure together the arms G', the plate E and the disks D, without, of course, interfering with the swinging movement of the handle G. In the disks D are journaled end portions of a shaft H which shaft carries within the wheels A and B gear wheels which mesh with and are driven by the internal rack of the said drive wheels. The shaft H is arranged beneath the plate E and is inclosed in a suitable casing the top of which is formed by said plate E and the sides and bottom of which are formed by a U-shape casing I. The outer faces of the gears X are provided with curved cam slots X'. The outer end portions of the shaft H carry suitable angled dogs H' which normally rest upon the strips forming the bottoms of the sockets X', said dogs being held in engagement with these ratchet sockets by means of coil springs $X^2$ which press respectively against the disks D and the gear wheels X, said gear wheels being keyed or otherwise slidably mounted upon the shaft H. By means of this construction, rotation of the shaft H is permitted only when the mower is moved in a forward direction.

Bevel gear wheels $H^2$, $H^3$, $H^4$ and $H^5$ are fixed upon the shaft H, being arranged in pairs, the gear wheels of each pair being oppositely arranged. These bevel gear wheels mesh respectively with bevel gears J', K', L' and M' which are carried by shafts J, K, L and M, which shafts are arranged at right angles to the shaft H and extend downwardly through the plate E. Cutting disks N, O, P and Q are secured upon the upper faces of the plate E, being fastened to said plate by suitable screws R and with the plate E form the bearings in which the last mentioned bevel gears rotate. These disks have saw-teeth formed upon their front edges, said teeth extending around said disks about one hundred and eighty degrees. These disks are also arranged in pairs each pair consisting of disks having saw-teeth pointing in different directions. The upper portions of the shafts J, K, L and M are squared and upon them are mounted toothed cutting disks $J^2$, $K^2$, $L^2$ and $M^2$ provided with suitable washers $J^3$, $K^3$, $L^3$ and $M^3$, said washers being provided with central bosses to receive the upper portions of the shafts J, K, L and M. The teeth of these last mentioned cutting disks which will be termed the rotatable disks, are also angled and the disks are so placed that the teeth of each rotatable disk will point in a direction opposite to the saw-teeth of the fixed disk above which it is mounted. Between these last mentioned disks and partially beneath the fixed disks are fixed forwardly extending tapering guide fingers S, said fingers being set in suitable transverse grooves formed in the plate E, the object of said fingers being to guide the grass to the cutting disks.

What I claim is:—

A lawn mower comprising drive wheels provided with internal racks and hub portions, sleeves fitting loosely within said hub portions, disks carried by said sleeves, a plate extending between said wheels and having angled end portions secured to said disks, a handle, curved arms secured to the handle and overlapping the angled portions of the plate, a pivot bolt passing through each sleeve, said bolts holding the arms of the handle to the plate and serving as pivots for said handle, a shaft journaled in said disks, gear wheels carried by said shaft and meshing with the internal rack, cutters mounted upon the plate and means carried by said shaft for rotating said cutters during forward movement of the machine.

JAMES H. HOLLAND.

Witnesses:
JAMES E. ISAACS,
E. L. BAILEY.